United States Patent
Ross et al.

(10) Patent No.: US 9,549,100 B2
(45) Date of Patent: Jan. 17, 2017

(54) LOW-LATENCY TIMING CONTROL

(71) Applicant: MICROSOFT TECHNOLOGY LICENSING, LLC, Redmond, WA (US)

(72) Inventors: Jonathan Ross, Woodinville, WA (US); Robert Allen Shearer, Woodinville, WA (US); Elene Terry, Los Altos, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 60 days.

(21) Appl. No.: 14/694,764

(22) Filed: Apr. 23, 2015

(65) Prior Publication Data
US 2016/0316110 A1    Oct. 27, 2016

(51) Int. Cl.
| | |
|---|---|
| *H04N 7/18* | (2006.01) |
| *H04N 5/073* | (2006.01) |
| *H04L 7/10* | (2006.01) |
| *H04N 5/06* | (2006.01) |
| *H04N 5/235* | (2006.01) |
| *H04N 5/76* | (2006.01) |
| *H04N 9/475* | (2006.01) |

(52) U.S. Cl.
CPC .............. *H04N 5/0733* (2013.01); *H04L 7/10* (2013.01); *H04N 5/06* (2013.01); *H04N 5/2353* (2013.01)

(58) Field of Classification Search
CPC  H04N 5/23206; H04N 1/2129; H04N 1/2133; H04N 13/025; H04N 7/181; H04N 21/242; G08B 13/19669; G08B 13/19641

USPC ...... 348/47–48, 143, 153, 159, 211.3, 231.5, 348/513
See application file for complete search history.

(56) References Cited

U.S. PATENT DOCUMENTS

| | | | |
|---|---|---|---|
| 5,995,140 A * | 11/1999 | Cooper | .................. H04N 7/181 348/153 |
| 6,160,548 A | 12/2000 | Lea et al. | |

(Continued)

OTHER PUBLICATIONS

Moreira, et al., "Nanosecond Accuracy using SoC Platforms", in IEEE International Symposium on Precision Clock Synchronization for Measurement, Control, and Communication, Sep. 22, 2014, 1 page.

(Continued)

*Primary Examiner* — Kelly L Jerabek
(74) *Attorney, Agent, or Firm* — Brianna Hinojosa-Flores; Judy Yee; Micky Minhas (57) ABSTRACT

A timing control system includes one or more device processors operatively coupled to one or more devices, a counter connected to the device processor(s), and a plurality of timing registers operatively coupled to the counter, each of the timing registers configured to store a value indicating a time at which an event is to be initiated at a corresponding one of the device(s). The system also includes a pulse generator operatively coupled to the counter and the timing registers, the pulse generator configured to generate one or more associated general-purpose input/output (GPIO) output signals, and send to each of the one or more devices an associated GPIO output signal to initiate the event at a plurality of the one or more devices in coordination with one another or to initiate the event at one of the one or more devices in coordination with another event at that device.

20 Claims, 5 Drawing Sheets

(56) References Cited

U.S. PATENT DOCUMENTS

| | | | |
|---|---|---|---|
| 6,340,991 B1* | 1/2002 | Chen | G06T 7/0022 |
| | | | 348/47 |
| 7,020,476 B2 | 3/2006 | Day et al. | |
| 7,112,774 B2* | 9/2006 | Baer | H01L 27/14643 |
| | | | 250/208.1 |
| 7,199,820 B2* | 4/2007 | Oka | H04N 5/073 |
| | | | 348/14.09 |
| 8,036,202 B2 | 10/2011 | Biederman et al. | |
| 8,630,314 B2 | 1/2014 | York | |
| 8,670,467 B2 | 3/2014 | Latremouille | |
| 8,723,970 B2* | 5/2014 | Ryu | H04N 21/242 |
| | | | 348/211.1 |
| 8,793,402 B2 | 7/2014 | Rodriguez et al. | |
| 2009/0089623 A1 | 4/2009 | Neering et al. | |
| 2009/0251601 A1 | 10/2009 | Ihlefeld et al. | |
| 2012/0162511 A1* | 6/2012 | Hewes | H04N 13/0051 |
| | | | 348/510 |
| 2013/0121347 A1 | 5/2013 | Saito et al. | |
| 2013/0177015 A1 | 7/2013 | House et al. | |
| 2013/0183905 A1 | 7/2013 | Richardson et al. | |
| 2014/0036076 A1* | 2/2014 | Nerayoff | H04N 7/181 |
| | | | 348/148 |

OTHER PUBLICATIONS

"MPC563xM Microcontroller Product Brief", Published on: May 2011, Available at: http://cache.freescale.com/files/32bit/doc/prod_brief/MPC5634MPB.pdf.

"Stereo Camera Synchronization", Retrieved on: Jan. 20, 2015, Available at: http://answers.ros.org/question/32912/stereo-camera-syncronization/.

* cited by examiner

LOW-LATENCY TIMING CONTROL

BACKGROUND

Hardware devices may perform actions for use by a computing system. The timing of such actions may affect the way in which the computing system processes or responds to results of the performed actions.

SUMMARY

Embodiments are disclosed for timing control systems that govern the occurrence of events at one or more hardware devices. An example timing control system includes one or more device processors operatively coupled to one or more devices and configured to receive information from each of the one or more devices and a counter connected to the one or more device processors via a low-latency interface. The example timing control system further includes a plurality of timing registers operatively coupled to the counter, each of the plurality of timing registers configured to store a value indicating a time at which an event is to be initiated at a corresponding one of the one or more devices. The example timing control system also includes a pulse generator operatively coupled to the counter and the plurality of timing registers. The pulse generator is configured to generate one or more associated general-purpose input/output (GPIO) output signals responsive to determining that a value of the counter has reached a value of one or more of the plurality of timing registers, and send to each of the one or more devices an associated GPIO output signal to initiate the event at a plurality of the one or more devices in coordination with one another or to initiate the event at one of the one or more devices in coordination with another event at the one of the one or more devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Event coordination at multiple devices may impact the processing and/or response of a computing system utilizing an output and/or result of the event being performed at the devices. For example, different cameras may capture different images of an environment at coordinated times. In another example, multiple sensors (e.g., image sensors, inertial measurement unit (IMU) sensors, microphones, etc.) may be instructed to capture and send data at coordinated times in order to provide a multifaceted context of a sensed environment.

The disclosure provides timing control that directly couples a counter, which controls the generation of output signals for initiating events at two or more devices, to a device processor (such as an image sensor processor). With such a configuration, the timing control described herein may provide precise synchronization between instances of external hardware elements and internal events (e.g., nanosecond synchronization, such that the difference between instances of external hardware elements and internal events is less than one nanosecond in some examples or measurable on the order of nanoseconds—e.g., less than 1 microsecond—in other examples). In addition to synchronization between elements, the timing control described herein may also synchronize between one event and the next using programmable timing registers that indicate a time (e.g., an absolute time or a relative time) at which events are to occur at the hardware elements. The centralized counter also allows for transparent access to the current value of the counter, which may be used for precise hardware timestamping of incoming data.

Figure 1:
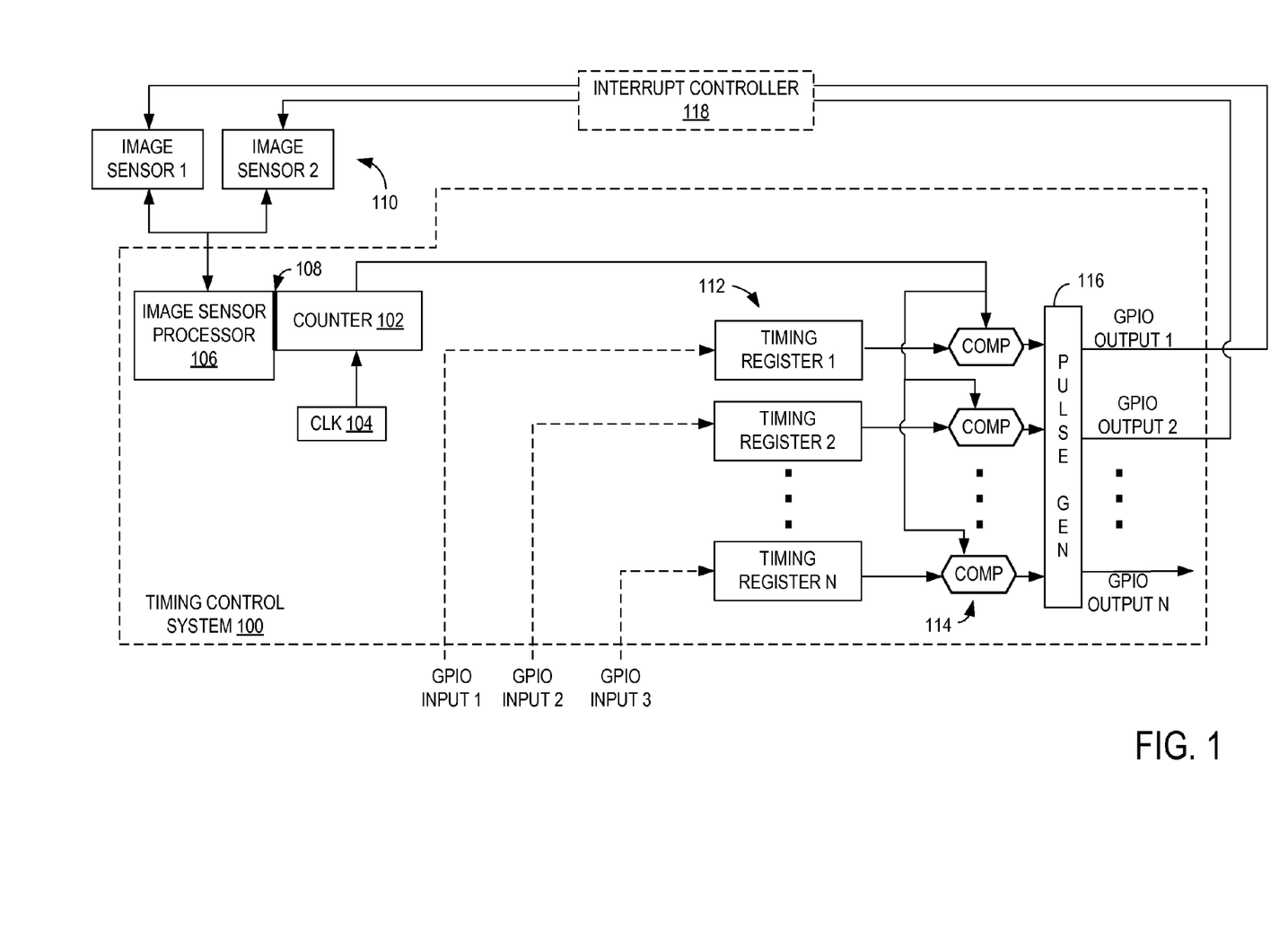
FIG. 1 shows a block diagram of an example timing control system.

FIG. 1 shows a block diagram of an example timing control system 100. The timing control system includes a centralized counter 102 governed by a clock 104. For example, a rising or trailing edge of a signal output by clock 104 may trigger counter 102 to increment. The counter may increment equal to or faster than 7.8125 MHz (e.g., a time between increments may be less than or equal to 128 ns). Accordingly, clock 104 may operate at any frequency equal to or greater than 7.8125 MHz. For example, a 62.5 MHz clock may be used.

The counter 102 is directly coupled to image sensor processor 106 via a low-latency interface 108. The image sensor processor 106 is operatively coupled to image sensors 110 to send and/or receive data to/from the image sensors 110. FIG. 1 shows the counter being coupled to an image sensor processor for illustrative purposes, however it is to be understood that the counter may be coupled to any suitable device processor or combination of device processors without departing from the scope of this disclosure. For example, the counter may be directly coupled to a controller/processor for one or more light emission devices (e.g., a light projector for a depth imaging system), a controller/processor for one or more inertial measurement unit (IMU) or other sensors, a central processing unit for a computing system, and/or the image sensor processor 106. Each device processor coupled to the counter may be operatively coupled to one or more associated devices, such as light emission devices/projectors, sensors, and/or other suitable devices. In this way, events may be coordinated between different types of devices and/or multiple devices of the same type. Accordingly, it is to be understood that description corresponding to the image sensor processor 106, the image sensors 110, and associated controlled events may be applied to a variety of different processors, devices, and events.

Returning to the example timing control system of FIG. 1, the low-latency interface 108 between counter 102 and image sensor processor 106 may include any suitable interface that introduces less than 1 μs delay during transmission of data from the counter to the image sensor processor. For example, the counter may be directly wired to the image sensor processor on the same application-specific integrated circuit (ASIC) such that the bits of the counter are directly wired to the image sensor processor without intervening processors or other devices. In other examples, the image sensor processor may be located on a different chip/ASIC than the counter and directly coupled via wiring that introduces very low latency (e.g., under 1 μs delay).

The counter 102 may be a 63 bit counter that is accessible via two 32 bit registers for the upper and lower halves of the counter. A read to the lower register may result in counter [31:0] (bits 0-31 of counter 102) while a read to the higher register may result in counter [62:32], counter [31] (bits 32-62 of counter 102 and bit 31 of counter 102 for ensuring alignment with the lower register). Overflow checks and counter reconstruction may be performed by applicable software routines based on the data read from the lower and upper registers.

Image sensor processor 106 may receive data from image sensors 110 (e.g., image sensor 1 and image sensor 2). It is to be understood that although two image sensors are illustrated, image sensor processor 106 may be operatively coupled to any number of image sensors. For example, where one or more devices other than image sensors are being coordinated with an image sensor, the image sensor processor 106 may be operatively coupled to one or more image sensor. When image sensors are being coordinated with one another, image sensor processor 106 may be operatively coupled to two or more image sensors.

Image sensor processor 106 may receive information (e.g., image data) from image sensors 110. Any suitable processing of the received image data may be performed at the image sensor processor 106. In order to resolve the placement of the received image data in time, the image sensor processor 106 may timestamp incoming frames of image data with a timestamp value corresponding to a current value of the counter. For example, the image sensor processor 106 may read a current value of the counter 102 responsive to receiving an image captured by one of the image sensors 110 and timestamp that image with the current value of the counter (or with a timestamp derived from the current value of the counter). The image sensor processor 106 may also be configured to encapsulate image data from the image sensors into packets. The packets may include one or more frames of image data and a header including the timestamp derived and applied as described above.

Counter 102 may also be operatively coupled to one or more timing registers 112. Each timing register may store a value indicating a time at which an event is to be initiated at a corresponding one of the image sensors. For example, timing register 1 may store a value indicating a time at which an image is to be captured at image sensor 1. The value of each of the timing registers 112 may be set to coordinate the initiation of an event (e.g., an image capture) at the corresponding image sensor relative to an initiation of the event (e.g., an image capture) at another image sensor. Different types of event coordination will be described below (e.g., with reference to FIGS. 3 and 4).

The timing registers may store different types of values based on the way in which the event is to be timed. For example, each timing register may store either a countdown value or an absolute time value. The absolute time value may correspond to a future time of the counter and indicate a future time at which the event is to occur. The countdown value may be a sum of a current value of the counter (e.g., a current value of the counter when the register is set and/or an absolute time at which a coordinated event is to occur) and a countdown duration.

As shown in FIG. 1, the timing registers may be operatively coupled to the counter 102 via an associated comparator 114. For each of the timing registers 112, if the timing register stores an absolute time value, the current time of the counter may be continuously compared to the value of the timing register (e.g., the counter value may be compared to the timing register responsive to each "tick" or increment of the counter 102/clock 104) to determine whether the time indicated by the timing register has been reached. The timing registers may be 32-bit registers. Accordingly, the comparators 114 may be configured to output a result of determining the difference between the lowest 32 bits of the counter and the 32 bits of the timing register. The time indicated by the timing register may be determined to have been reached responsive to the $32^{nd}$ bit of unsigned (current counter [31:0]-register [31:0]) is zero.

A pulse generator 116 is operatively coupled to the counter 102 and each of the timing registers 112 (e.g., through comparators 114). The pulse generator may be configured to generate one or more associated general-purpose input/output (GPIO) output signals responsive to determining that a value of the counter has reached a value of one or more of the timing registers 112. For example, each of the GPIO output signals 1-N may be associated with corresponding timing registers 1-N (e.g., GPIO 1 may be asserted responsive to the value of the counter reaching the value of timing register 1). The pulse generator 116 may then send an associated GPIO output signal to initiate an event at an associated image sensor (e.g., GPIO 1 may be sent to image sensor 1 and GPIO 2 may be sent to image sensor 2). Since the values of the timing registers are set to coordinate the events of the image sensors with one another, the GPIO signals may be sent to initiate the event at the image sensors (e.g., control the image sensors to capture an image) in coordination with one another. It is to be understood that one or more GPIO output signals may be triggered based on one or more GPIO input signals. For example, the one or more GPIO input signals may be generated based upon another event. In this way, the GPIO output signals may provide a feedback loop to tie different events to one another.

For each of the timing registers 112, if the timing register stores a countdown value, the countdown value may be continuously compared to the counter 102 as described above to control the output of an associated GPIO signal. In another example, the value of the timing register may be the countdown duration and the timing register may comprise and/or be operatively coupled to a countdown register. Upon receiving an indication to start counting down (e.g., from a GPIO input signal received from another device), the value in the timing register (e.g., the countdown duration) may be loaded into the countdown register and/or a timer, which may then decrement with each "tick" of clock 102. In such an example, the pulse generator 116 may generate and send out an associated GPIO output signal responsive to the countdown register and/or timer reaching zero. Once the countdown register and/or counter reaches zero, it returns to the previously programmed value to allow subsequent triggers of the GPIO output signals.

The type of value stored in the timing register and/or the value stored in the timing register may be set based on one or more GPIO input signals received from an external device and/or independently programmed framesync "START"s. For example, each framesync START may include a mode bit which enables a register storing a given type of value. When set to a first value, the mode bit may indicate that a GPIO output signal is to be output responsive to determining that the value of the counter has reached the value of an enabled timing register. When set to a second value, the mode bit may indicate that a GPIO output signal is to be output responsive to counting down from the value in an enabled register to zero when set to a second value. The framesync "START"s may also include an enable bit that is automatically set to 1 by hardware when a corresponding timing register is written and cleared to 0 responsive to an output of a GPIO output signal (e.g., a "START" pulse) and/or a reset of the system. The enable bit may be set using an input GPIO signal and may fan out to a configurable number of framesync "START"s.

The pulse generator 116 may be configured to output framesync "START" signals that may each be configured to communicate to a GPIO interface and/or generate interrupts (e.g., at an associated image sensor 110). It is to be understood that the GPIO outputs illustrated in FIG. 1 may include and/or be output in addition to framesync "START" pulses. The width of pulses output by pulse generator 116 may be programmable on a per-signal basis and may be set to a number of clock ticks. For example, a default pulse width may be the number of clock ticks that is closest to 10 µs without being lower. For instance, if the clock is 7.8125 MHz, a default width value of 79 may be used for the width of the pulse to be 10.112 µs.

The output of the pulse generator 116 may be sent directly to an associated device (e.g., an associated one of image sensors 110) without passing through an intermediary device or controller in some examples. In other examples, an intermediary interrupt controller 118 and/or other device(s) may receive the outputs of pulse generator 116 and control interrupts at associated hardware devices (e.g., image sensors 110) according to the received pulse generator outputs. For example, the interrupt controller 118 may receive a "START" pulse from pulse generator 116 directed to image sensor 1 and, in response, send an interrupt to image sensor 1 to initiate an event (e.g., an image capture) at image sensor 1. Responsive to receiving the GPIO output, "START" pulse, and/or interrupt signal from pulse generator 116 and/or interrupt controller 118, the image sensor may execute the event (e.g., capture an image) and/or send information (e.g., captured image data) to image sensor processor 106.

As the image sensor processor 106 is directly coupled to the counter 102, the image sensor processor may be configured to infer a capture time of a received image based on one or more of a receive timestamp and a capture-signal send time. The receive timestamp may correspond to the current value of the counter at the time the image was received at the image sensor processor. The capture-signal send time may correspond to the time of the timing register that caused the GPIO output signal to be sent to the image sensor that captured/transmitted the received image.

As described above, any suitable number and/or type of events may be coordinated using a timing control system, such as timing control system 100 of FIG. 1. Some types of coordinated events may benefit from aligning start times of the events, while other types may benefit from aligning other points in the events. In still other examples, events may be coordinated such that two or more events do not overlap and/or have a specified delay between points in the events. For example, an output of a light emitter may be coordinated with an exposure time (e.g., a shutter open time) of an imaging device such that the imaging device captures an image when the light emitter is not emitting light (e.g., for low-light exposure and/or to reduce glare in a captured image). The output of the light emitter may additionally or alternatively be coordinated with an exposure time of the imaging device such that the imaging device captures an image when the light emitter is emitting light (e.g., when the light emitter provides illumination for a flash function to assist in focusing in low-light environments). In examples where two or more light emitters project light for use in depth imaging (e.g., structured light or time of flight), an imaging device may be coordinated to capture an image when one of the light emitters projects light but not when another of the light emitters projects light (or after a delay has elapsed from when one of the light emitters projected light).

Figure 2:
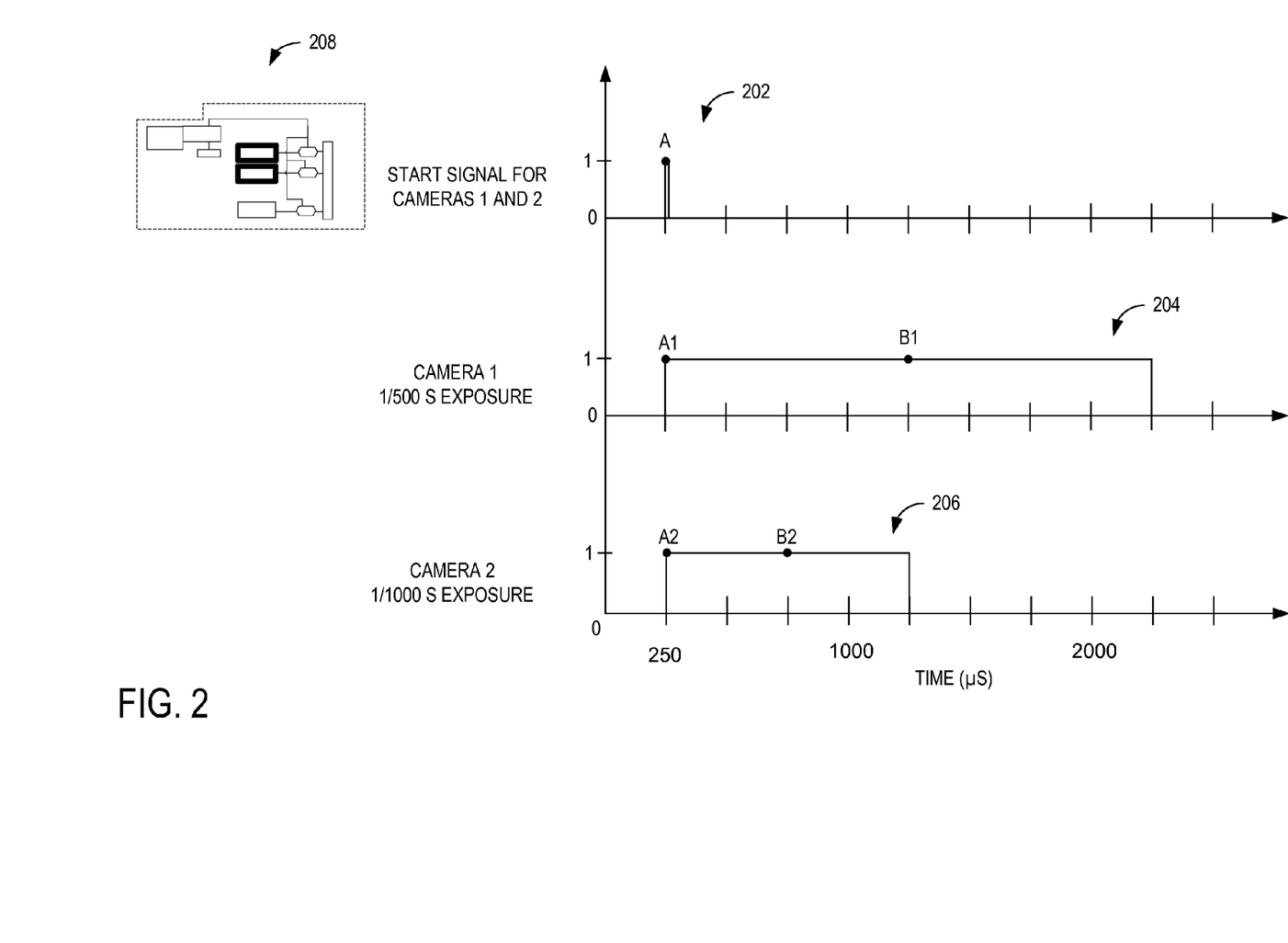
FIG. 2 shows example plots of frame synchronization signal and camera exposure activations for aligning camera exposure start times.

FIG. 2 shows example plots of a frame synchronization signal (202) and camera exposure activations (204 and 206) for aligning camera exposure start times for two cameras. As shown at point A on plot 202, a framesync "START" signal is asserted at 250 µs for both cameras 1 and 2 (e.g., image sensors 1 and 2 of FIG. 1). As illustrated by the highlighted regions of timing system 208 (which may correspond to timing control system 100 of FIG. 1), the signal output in plot 202 may be output based on values stored in two timing registers (e.g., timing registers 1 and 2 of FIG. 1). In response to the "START" signal at 250 µs, each of cameras 1 and 2 open associated shutters to begin an exposure time, as illustrated at point A1 on plot 204 and point A2 on plot 206 for cameras 1 and 2, respectively. Each camera captures a respective image for an associated exposure time. The shutter of camera 1, which has an exposure time of ⅕₀₀ seconds in this example, remains open for a longer duration than that of camera 1, which has an exposure time of 1/1000 seconds in this example. Since both cameras started the associated exposures at the same time but for a different duration, a midpoint in exposure time of camera 1 (illustrated at B1 in plot 204) occurs at a different time than a midpoint in exposure time of camera 2 (illustrated at B2 in plot 206).

Figure 3:
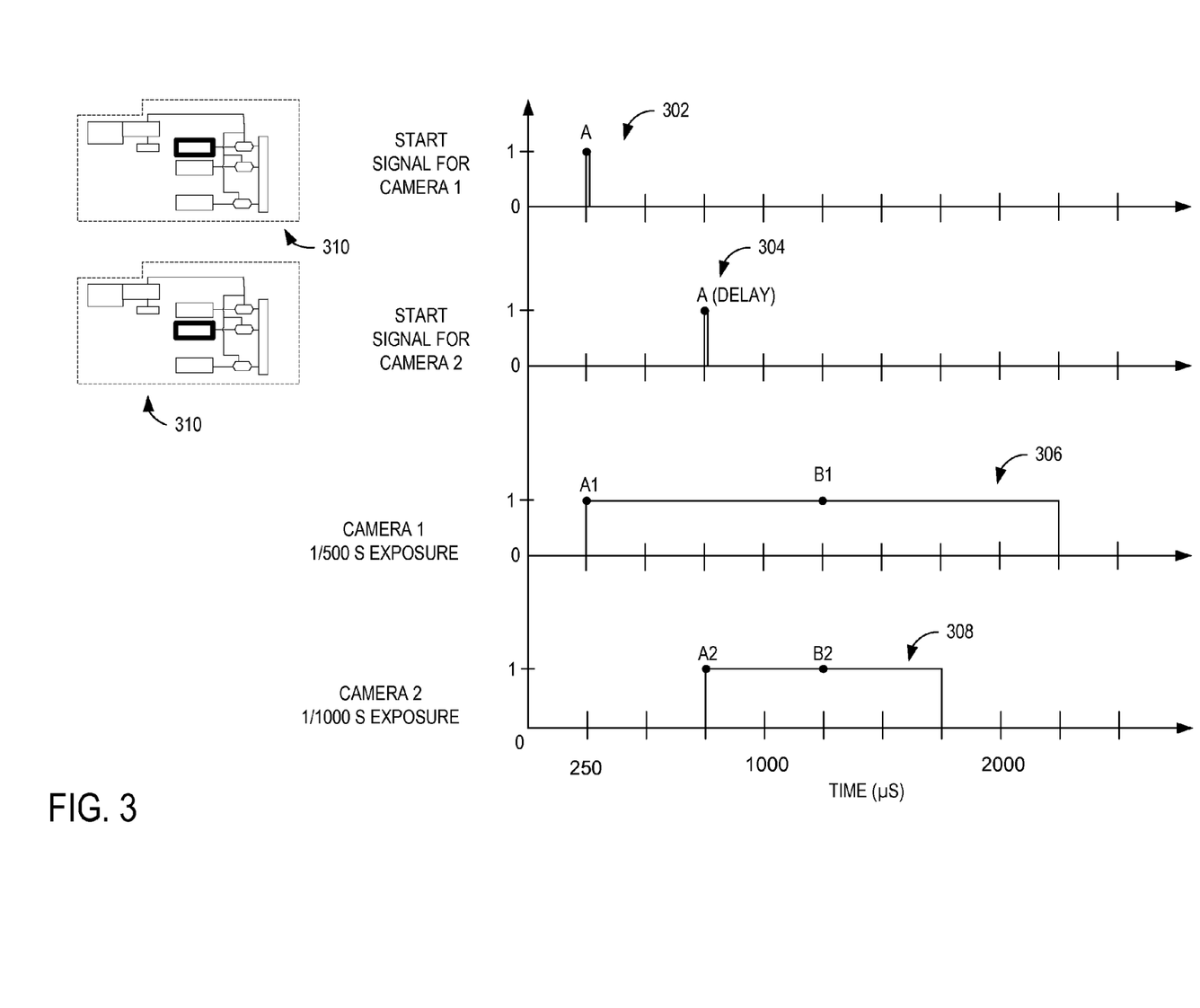
FIG. 3 shows example plots of frame synchronization signals and camera exposure activations for aligning camera exposure midpoint times.

When synchronizing frames of image data from multiple cameras having different exposure times, utilizing the same "START" signal for each camera may not provide an appropriate level of frame synchronization for a given process. FIG. 3 shows example plots of frame synchronization signals (302 and 304) and camera exposure activations (306 and 308) for aligning camera exposure midpoint times. As illustrated in FIG. 3, the "START" signal for camera 2 (e.g., the initiation of an image capture event) may be delayed relative to the "START" signal for camera 1 (e.g., as illustrated at point A of plot 302 and point A (delay) of plot 304) in order to align the midpoints (B1 and B2) of the exposure times of cameras 1 and 2 to one another. As illustrated by the highlighted regions of timing system 310 (which may correspond to timing control system 100 of FIG. 1), the signal output in plot 202 may be output based on a value stored in a first timing register (e.g., timing register 1 of FIG. 1), while the signal output in plot 204 may be output based on a value stored in a second timing register (e.g., timing register 2 of FIG. 1).

Figure 4:
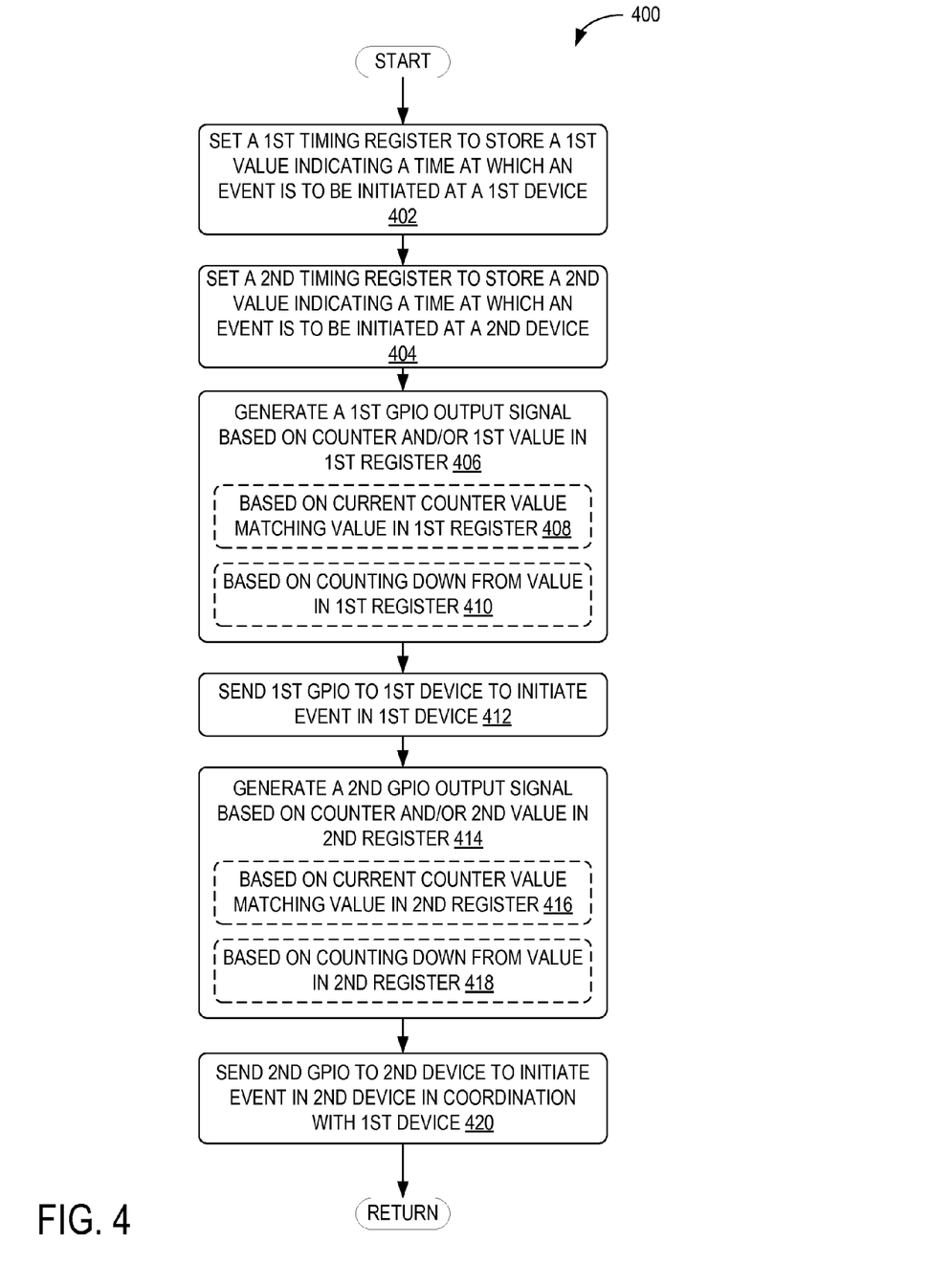
FIG. 4 shows an example method of timing events using a timing control system.

FIG. 4 shows an example method 400 of timing events using a timing control system. Method 400 may be performed by any suitable timing control system, such as timing control system 100 of FIG. 1. At 402, method 400 includes setting a first timing register to store a first value indicating a time at which an event is to be initiated at a first device. At 404, the method includes setting a second timing register to store a second value indicating a time at which an event is to be initiated at a second device. At 406, the method includes generating a first GPIO output signal based on a current counter value and/or the first value in the first register. For example, the generation of the first GPIO output signal may be performed based on a current counter value matching the value in the first register, as indicated at 408. The GPIO output signal may additionally or alternatively be performed based on counting down from a value in the first register (e.g., to zero), as indicated at 410. At 412, the method includes sending the first GPIO output signal to the first device in order to initiate the event in the first device.

At 414, the method includes generating a second GPIO output signal based on a current counter value and/or the first value in the first register. For example, the generation of the second GPIO output signal may be performed based on a current counter value matching the value in the second register, as indicated at 416. The GPIO output signal may additionally or alternatively be performed based on counting down from a value in the second register (e.g., to zero), as indicated at 418. At 420, the method includes sending the second GPIO output signal to the second device in order to initiate the event in the second device in coordination with the first device.

Although method 400 is described in reference to a timing control system that includes one or more device processors coupled to two or more devices, it is to be understood that the method may be performed in a system that includes one or more device processors coupled to one or more devices. For example, one device may be controlled to perform actions at regular intervals (e.g., at 16.7 ms, 33.3 ms, etc.), with GPIO output signals being generated as described above with respect to method 400. Optionally, feedback from the single device may be received into the timing control system (e.g., to control the timing of generating GPIO output signals and performing future events).

A timing control system as described herein and illustrated in FIG. 1, for example, may provide precise synchronization between internal and/or external target hardware devices by allowing a centralized counter to communicate directly with components that timestamp incoming signals (e.g., image sensor processor 106 of FIG. 1) and components that control events at external hardware devices. In this way, different controls or types of controls may be aligned according to start times, midpoints, and/or any other suitable point in the controlled event.

Figure 5:
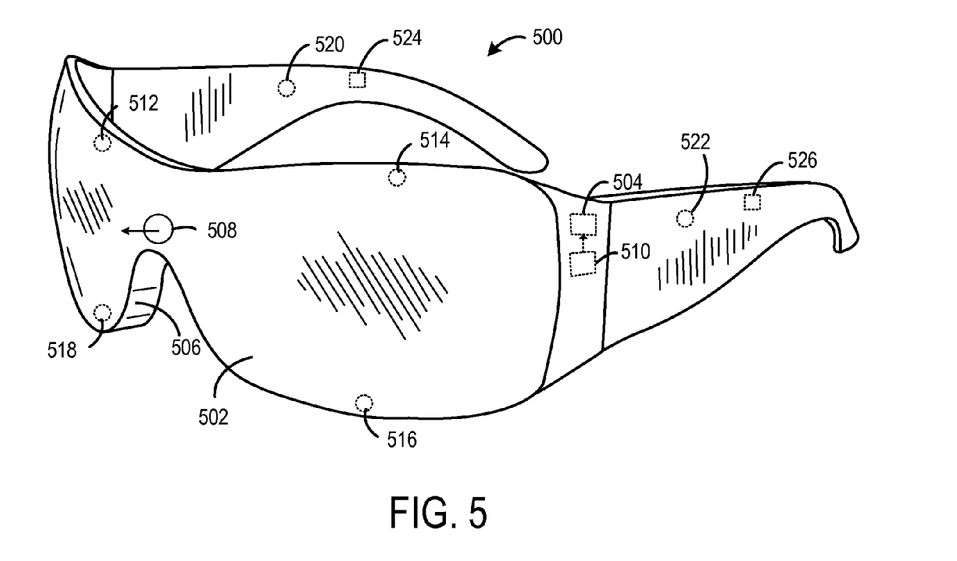
FIG. 5 shows an example head-mounted display (HMD) device.

The timing control described herein may be used with any suitable computing device, such as sensor aggregators that control, receive, and/or process data captured at one or more sensors. For example, in some embodiments, the disclosed timing control system may be a part of a head-mounted display (HMD) device. FIG. 5 shows a non-limiting example of an HMD device 500 in the form of a pair of wearable glasses with a transparent display 502. It will be appreciated that an HMD device may take any other suitable form in which a transparent, semi-transparent, and/or non-transparent display is supported in front of a viewer's eye or eyes.

The HMD device 500 includes a controller 504 configured to control operation of the see-through display 502. For example, the controller 504 may include and/or be operatively coupled to a timing control system, such as timing control system 100 of FIG. 1. The see-through display 502 may enable images such as holographic objects to be delivered to the eyes of a wearer of the HMD device 500. The see-through display 502 may be configured to visually augment an appearance of a real-world, physical environment to a wearer viewing the physical environment through the transparent display. For example, the appearance of the physical environment may be augmented by graphical content that is presented via the transparent display 502 to create a mixed reality environment. In one example, the display may be configured to display one or more visual digital content items. In some cases, the digital content items may be virtual objects overlaid in front of the real-world environment. Likewise, in some cases, the digital content items may incorporate elements of real-world objects of the real-world environment seen through the transparent display 502.

Any suitable mechanism may be used to display images via transparent display 502. For example, transparent display 502 may include image-producing elements located within lenses 506 (such as, for example, a see-through Organic Light-Emitting Diode (OLED) display). As another example, the transparent display 502 may include a light modulator located within a frame of HMD device 500. In this example, the lenses 506 may serve as a light guide for delivering light from the light modulator to the eyes of a wearer. Such a light guide may enable a wearer to perceive a 3D holographic image located within the physical environment that the wearer is viewing, while also allowing the wearer to view physical objects in the physical environment, thus creating a mixed reality environment.

The HMD device 500 may also include various sensors and related systems to provide information to the controller 504. Such sensors may include, but are not limited to, a microphone array, one or more outward facing image sensors 508, and an inertial measurement unit (IMU) 510. The sensors may correspond to hardware devices controlled by the timing control system 100 of FIG. 1. For example, image sensors 1 and 2 of FIG. 1 may correspond to outward-facing and user-facing cameras of the HMD device 500. In other examples, two or more of the sensors of the HMD device 500 may be controlled by a timing control system to coordinate events at the sensors.

As a non-limiting example, the microphone array may include six microphones located on different portions of the HMD device 500. In some implementations, microphones 512 and 514 may be positioned on a top portion of the lens 506, and may be generally forward facing. Microphones 512 and 514 may be aimed at forty five degree angles relative to a forward direction of the HMD device 500. Microphones 512 and 514 may be further aimed in a flat horizontal plane of the HMD device 500. Microphones 512 and 514 may be omnidirectional microphones configured to capture sound in the general area/direction in front of the HMD device 500, or may take any other suitable form.

Microphones 516 and 518 may be positioned on a bottom portion of the lens 506. As one non-limiting example, microphones 516 and 518 may be forward facing and aimed downward to capture sound emitted from the wearer's mouth. In some implementations, microphones 516 and 518 may be directional microphones. In some implementations, microphones 512, 514, 516, and 518 may be positioned in a frame surrounding the lens 506.

Microphones 520 and 522 each may be positioned on side frame of the HMD device 500. Microphones 520 and 522 may be aimed at ninety degree angles relative to a forward direction of the HMD device 500. Microphones 520 and 522 may be further aimed in a flat horizontal plane of the HMD device 500. The microphones 520 and 522 may be omnidirectional microphones configured to capture sound in the general area/direction on each side of the HMD device 500. It will be understood that any other suitable microphone array other than that described above also may be used.

As discussed above, the microphone array may produce an audio data stream that may be analyzed by controller 504 to detect a conversation between a wearer of the HMD device and another person. In one non-limiting example, using digital signal processing, a root-mean-square perceived loudness from each microphone transducer may be calculated, and a weighted function may report if the microphones on the left or right are reporting a louder sound, and by how much. Similarly, a value may be reported for "towards mouth" and "away from mouth", and "Front vs side". This data may be used to determine a source location of human speech segments. Further, the controller 504 may be configured to detect a conversation by determining that human speech segments alternate between different source locations.

It will be understood that the depicted microphone array is merely one non-limiting example of a suitable microphone array, and any suitable number of microphones in any suitable configuration may be implemented without departing from the scope of the present disclosure.

The one or more outward facing image sensors 508 may be configured to capture visual data from the physical environment in which the HMD device 500 is located. For example, the outward facing sensors 508 may be configured to detect movements within a field of view of the display 502, such as movements performed by a wearer or by a person or physical object within the field of view. In one example, the outward facing sensors 508 may detect a user speaking to a wearer of the HMD device. The outward facing sensors may also capture 2D image information and depth information from the physical environment and physical objects within the environment. As discussed above, such image data may be used to visually recognize that a user is speaking to the wearer. Such analysis may be combined with the analysis of the audio data stream to increase a confidence of conversation detection.

The IMU 510 may be configured to provide position and/or orientation data of the HMD device 500 to the controller 504. In one embodiment, the IMU 510 may be configured as a three-axis or three-degree of freedom position sensor system. This example position sensor system may, for example, include three gyroscopes to indicate or measure a change in orientation of the HMD device 500 within 3D space about three orthogonal axes (e.g., x, y, z) (e.g., roll, pitch, yaw). The orientation derived from the sensor signals of the IMU may be used to determine a direction of a user that has engaged the wearer of the HMD device in a conversation.

In another example, the IMU 510 may be configured as a six-axis or six-degree of freedom position sensor system. Such a configuration may include three accelerometers and three gyroscopes to indicate or measure a change in location of the HMD device 500 along the three orthogonal axes and a change in device orientation about the three orthogonal axes. In some embodiments, position and orientation data from the image sensor 508 and the IMU 510 may be used in conjunction to determine a position and orientation of the HMD device 500.

The HMD device 500 may further include speakers 524 and 526 configured to output sound to the wearer of the HMD device. The speakers 524 and 526 may be positioned on each side frame portion of the HMD device proximate to the wearer's ears. For example, the speakers 524 and 526 may play audio content such as music, or a soundtrack to visual content displayed via the see-through display 502. In some cases, a volume of the speakers may be lowered or muted in response to a conversation between the wearer and another person being detected.

The controller 504 may include a logic machine and a storage machine, as discussed in more detail below with respect to FIG. 6 that may be in communication with the various sensors and display of the HMD device 500. In one example, the storage machine may include instructions that are executable by the logic machine to receive an audio data stream from one or more sensors, such as the microphone array, detect a conversation between the wearer and a user based on the audio data stream, and modify presentation of a digital content item in response to detecting the conversation.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
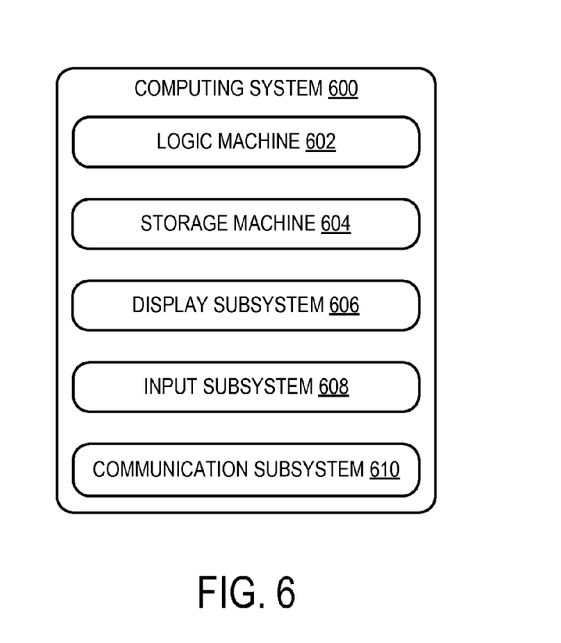
FIG. 6 shows an example computing system.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic machine 602 and a storage machine 604. Computing system 600 may optionally include a display subsystem 606, input subsystem 608, communication subsystem 610, and/or other components not shown in FIG. 6.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes one or more physical devices configured to hold instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic machine 602 executing instructions held by storage machine 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 606 may be used to present a visual representation of data held by storage machine 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic machine 602 and/or storage machine 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

Example timing control systems and methods are disclosed. In one example, a timing control system comprises one or more device processors operatively coupled to one or more devices and configured to receive information from each of the one or more devices; a counter connected to the one or more device processors via a low-latency interface; a plurality of timing registers operatively coupled to the counter, each of the plurality of timing registers configured to store a value indicating a time at which an event is to be initiated at a corresponding one of the one or more devices; and a pulse generator operatively coupled to the counter and the plurality of timing registers, the pulse generator configured to: generate one or more associated general-purpose input/output (GPIO) output signals responsive to determining that a value of the counter has reached a value of one or more of the plurality of timing registers, and send to each of the one or more devices an associated GPIO output signal to initiate the event at a plurality of the one or more devices in coordination with one another or to initiate the event at one of the one or more devices in coordination with another event at the one of the one or more devices. Any combination of the above and/or below examples may be configured wherein the counter is directly connected to the one or more device processors via a low-latency interface. Any combination of the above and/or below examples may be configured wherein, for each of the timing registers, the value of that register is configured to be set to coordinate the initiation of the event at the corresponding device relative to an initiation of the event at another device of the two or more devices. Any combination of the above and/or below examples may be configured wherein the one or more device processors include an image sensor processor and the one or more devices includes two or more image sensors. Any combination of the above and/or below examples may be configured wherein the event comprises capturing an image with the two or more image sensors, each image sensor capturing a respective image for an associated exposure time. Any combination of the above and/or below examples may be configured wherein, for each of the timing registers, the value of that register is configured to be set to coordinate the initiation of the event at the corresponding device relative to an initiation of the event at another device such that the time of each of the timing registers is configured to align a midpoint of the associated exposure time for each of the two or more image sensors to a midpoint of the associated exposure time for one or more other image sensors of the two or more image sensors. Any combination of the above and/or below examples may be configured wherein the image sensor processor is configured to timestamp a received image captured by one of the two or more image sensors with a current value of the counter. Any combination of the above and/or below examples may be configured wherein the one or more devices comprise an image sensor and a light emitter, the time of each of the timing registers configured to be set to coordinate an image capture event at the image sensor and a light emission event at the light emitter. Any combination of the above and/or below examples may be configured wherein the counter is configured to increment at a frequency that is greater than or equal to 7.8125 MHz. Any combination of the above and/or below examples may be configured wherein the low-latency interface is configured to introduce less than 1 µs of delay in transmission of data between the counter and the device processor. Any combination of the above and/or below examples may be configured wherein each of the plurality of timing registers is configured to store a type of value corresponding to one of a countdown value and an absolute time value, the countdown value comprising a sum of a current value of the counter and a countdown duration. Any combination of the above and/or below examples may be configured wherein one or more of a mode indicating the type of value used in one or more of the plurality of timing registers and the value of one or more of the plurality of timing registers is configured to be set based on a GPIO input signal received from an external device.

In another example, a timing control system comprises an image sensor processor operatively coupled to a first image sensor and a second image sensor and configured to receive information from each of the first and second image sensors; a counter directly connected to the image sensor processor via a low-latency interface; a first timing register and a second timing register, each of the first and second timing registers operatively coupled to the counter, the first timing register configured to store a value indicating a time at which an image is to be captured at the first image sensor and the second timing register configured to store a value indicating a time at which an image is to be captured at the second image sensor, for each of the timing registers, the value of that register configured to be set to coordinate the initiation of the image capture at the corresponding image sensor relative to an initiation of the image capture at the other image sensor; and a pulse generator operatively coupled to the counter and the first and second timing registers, the pulse generator configured to: generate and send, to the first image sensor, a first general-purpose input/output (GPIO) output signal responsive to determining that a value of the counter has reached the value of the first timing register, and generate and send, to the second image sensor, a second GPIO output signal responsive to determining that a value of the counter has reached the value of the second timing register to initiate the image capture at the first and second image sensors in coordination with one another. Any combination of the above and/or below examples may be configured wherein the image capture at the first and second image sensors are configured to be initiated in coordination with one another such that the time of each of the first and second timing registers is configured to be set to align a midpoint of an associated exposure time for each of the first and second image sensors. Any combination of the above and/or below examples may be configured wherein the image sensor processor is configured to read a current value of the counter responsive to receiving an image captured by the first or the second image sensor and generate a header for the image comprising a timestamp based on the current value of the counter. Any combination of the above and/or below examples may be configured wherein a duration between increments of the counter is configured to be less than or equal to 128 ns. Any combination of the above and/or below examples may be configured wherein each of the first and second timing registers is configured to store a selected one of a countdown value and an absolute time value, the countdown value comprising a sum of a current value of the counter and a countdown duration.

In another example, a timing control system comprises an image sensor processor operatively coupled to a first image sensor and a second image sensor and configured to receive image data from each of the first and second image sensors and to timestamp the received image data; a counter directly connected to the image sensor processor via a low-latency interface; a first timing register and a second timing register, each of the first and second timing registers operatively coupled to the counter, the first timing register storing a value indicating a time at which an image is to be captured at the first image sensor and the second timing register storing a value indicating a time at which an image is to be captured at the second image sensor, for each of the timing registers, the value of that register being set to coordinate an exposure time of the first image sensor to an exposure time of the second image sensor; and a pulse generator operatively coupled to the counter and the first and second timing registers, the pulse generator configured to: generate and send, to the first image sensor, a first general-purpose input/output (GPIO) output signal responsive to determining that a value of the counter has reached the value of the first timing register, and generate and send, to the second image sensor, a second GPIO output signal responsive to determining that a value of the counter has reached the value of the second timing register to delay initiation of an associated image capture at the second image sensor relative to an initiation of an associated image capture at the first image sensor to align a midpoint of exposure times of the first and second image sensors during the associated image captures at the first and second image sensors. Any combination of the above and/or below examples may be configured wherein the image sensor processor is configured to read a value of the counter responsive to receiving image data from one or more of the first and the second image sensors and generate a header for the image data including a timestamp based on the value of the counter. Any combination of the above and/or below examples may be configured wherein the image sensor processor is configured to determine a capture time of the received image based on a receive timestamp and a capture-signal send time.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:
1. A timing control system comprising:
  one or more device processors operatively coupled to one or more devices and configured to receive information from each of the one or more devices;
  a counter connected to the one or more device processors via a low-latency interface;
  a plurality of timing registers operatively coupled to the counter, each of the plurality of timing registers configured to store a value indicating a time at which an event is to be initiated at a corresponding one of the one or more devices; and
  a pulse generator operatively coupled to the counter and the plurality of timing registers, the pulse generator configured to:

generate one or more associated general-purpose input/output (GPIO) output signals responsive to determining that a value of the counter has reached a value of one or more of the plurality of timing registers, and send to each of the one or more devices an associated GPIO output signal to initiate the event at a plurality of the one or more devices in coordination with one another or to initiate the event at one of the one or more devices in coordination with another event at the one of the one or more devices.

2. The timing control system of claim 1, wherein the counter is directly connected to the one or more device processors via a low-latency interface.

3. The timing control system of claim 1, wherein, for each of the timing registers, the value of that register is configured to be set to coordinate the initiation of the event at the corresponding device relative to an initiation of the event at another device of the two or more devices.

4. The timing control system of claim 1, wherein the one or more device processors include an image sensor processor and the one or more devices includes two or more image sensors.

5. The timing control system of claim 4, wherein the event comprises capturing an image with the two or more image sensors, each image sensor capturing a respective image for an associated exposure time.

6. The timing control system of claim 5, wherein, for each of the timing registers, the value of that register is configured to be set to coordinate the initiation of the event at the corresponding device relative to an initiation of the event at another device such that the time of each of the timing registers is configured to align a midpoint of the associated exposure time for each of the two or more image sensors to a midpoint of the associated exposure time for one or more other image sensors of the two or more image sensors.

7. The timing control system of claim 5, wherein the image sensor processor is configured to timestamp a received image captured by one of the two or more image sensors with a current value of the counter.

8. The timing control system of claim 1, wherein the one or more devices comprise an image sensor and a light emitter, the time of each of the timing registers configured to be set to coordinate an image capture event at the image sensor and a light emission event at the light emitter.

9. The timing control system of claim 1, wherein the counter is configured to increment at a frequency that is greater than or equal to 7.8125 MHz.

10. The timing control system of claim 1, wherein the low-latency interface is configured to introduce less than 1 μs of delay in transmission of data between the counter and the device processor.

11. The timing control system of claim 1, wherein each of the plurality of timing registers is configured to store a type of value corresponding to one of a countdown value and an absolute time value, the countdown value comprising a sum of a current value of the counter and a countdown duration.

12. The timing control system of claim 11, wherein one or more of a mode indicating the type of value used in one or more of the plurality of timing registers and the value of one or more of the plurality of timing registers is configured to be set based on a GPIO input signal received from an external device.

13. A timing control system comprising:
an image sensor processor operatively coupled to a first image sensor and a second image sensor and configured to receive information from each of the first and second image sensors;
a counter directly connected to the image sensor processor via a low-latency interface;
a first timing register and a second timing register, each of the first and second timing registers operatively coupled to the counter, the first timing register configured to store a value indicating a time at which an image is to be captured at the first image sensor and the second timing register configured to store a value indicating a time at which an image is to be captured at the second image sensor, for each of the timing registers, the value of that register configured to be set to coordinate the initiation of the image capture at the corresponding image sensor relative to an initiation of the image capture at the other image sensor; and
a pulse generator operatively coupled to the counter and the first and second timing registers, the pulse generator configured to:
generate and send, to the first image sensor, a first general-purpose input/output (GPIO) output signal responsive to determining that a value of the counter has reached the value of the first timing register, and
generate and send, to the second image sensor, a second GPIO output signal responsive to determining that a value of the counter has reached the value of the second timing register to initiate the image capture at the first and second image sensors in coordination with one another.

14. The timing control system of claim 13, wherein the image capture at the first and second image sensors are configured to be initiated in coordination with one another such that the time of each of the first and second timing registers is configured to be set to align a midpoint of an associated exposure time for each of the first and second image sensors.

15. The timing control system of claim 13, wherein the image sensor processor is configured to read a current value of the counter responsive to receiving an image captured by the first or the second image sensor and generate a header for the image comprising a timestamp based on the current value of the counter.

16. The timing control system of claim 13, wherein a duration between increments of the counter is configured to be less than or equal to 128 ns.

17. The timing control system of claim 13, wherein each of the first and second timing registers is configured to store a selected one of a countdown value and an absolute time value, the countdown value comprising a sum of a current value of the counter and a countdown duration.

18. A timing control system comprising:
an image sensor processor operatively coupled to a first image sensor and a second image sensor and configured to receive image data from each of the first and second image sensors and to timestamp the received image data;
a counter directly connected to the image sensor processor via a low-latency interface;
a first timing register and a second timing register, each of the first and second timing registers operatively coupled to the counter, the first timing register storing a value indicating a time at which an image is to be captured at the first image sensor and the second timing register storing a value indicating a time at which an image is to be captured at the second image sensor, for each of the timing registers, the value of that register being set to coordinate an exposure time of the first image sensor to an exposure time of the second image sensor; and a pulse generator operatively coupled to the counter and the first and second timing registers, the pulse generator configured to:

generate and send, to the first image sensor, a first general-purpose input/output (GPIO) output signal responsive to determining that a value of the counter has reached the value of the first timing register, and generate and send, to the second image sensor, a second GPIO output signal responsive to determining that a value of the counter has reached the value of the second timing register to delay initiation of an associated image capture at the second image sensor relative to an initiation of an associated image capture at the first image sensor to align a midpoint of exposure times of the first and second image sensors during the associated image captures at the first and second image sensors.

19. The timing control system of claim 18, wherein the image sensor processor is configured to read a value of the counter responsive to receiving image data from one or more of the first and the second image sensors and generate a header for the image data including a timestamp based on the value of the counter.

20. The timing control system of claim 19, wherein the image sensor processor is configured to determine a capture time of the received image based on a receive timestamp and a capture-signal send time.

* * * * *